W. D. RANDALL.
VALVE FOR MIXING FLUIDS.
APPLICATION FILED SEPT. 25, 1915.

1,202,425.

Patented Oct. 24, 1916.

Witnesses

Inventor
W. D. Randall,
By C. L. Parker,
Attorney

UNITED STATES PATENT OFFICE.

WILLIAM D. RANDALL, OF MONETT, MISSOURI, ASSIGNOR OF ONE-HALF TO MELVIN W. LOYD, OF AFTON, OKLAHOMA.

VALVE FOR MIXING FLUIDS.

1,202,425.  Specification of Letters Patent.  Patented Oct. 24, 1916.

Application filed September 25, 1915. Serial No. 52,618.

*To all whom it may concern:*

Be it known that I, WILLIAM D. RANDALL, a citizen of the United States, residing at Monett, in the county of Barry and State of Missouri, have invented certain new and useful Improvements in Valves for Mixing Fluids, of which the following is a specification.

My invention relates to improvements in valve structures, adapted to control the passage of two or more fluids to a common conduit, such as water and steam, for effecting a thorough mixture of the same or for forcing the water to a desired point.

An important object of the invention is to provide a valve structure of the above mentioned character, which is simple in construction, inexpensive to manufacture, and reliable in operation.

Other objects and advantages of the invention will be apparent during the course of the following description.

Figure 1:
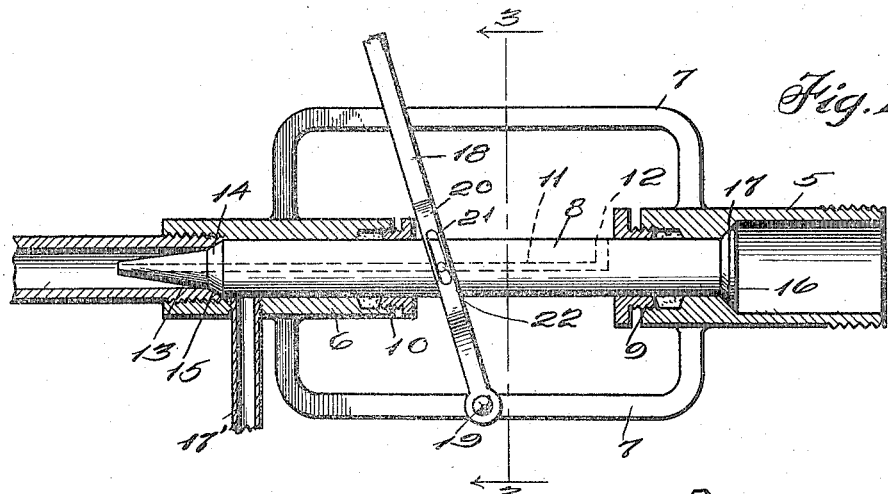
Figure 2:
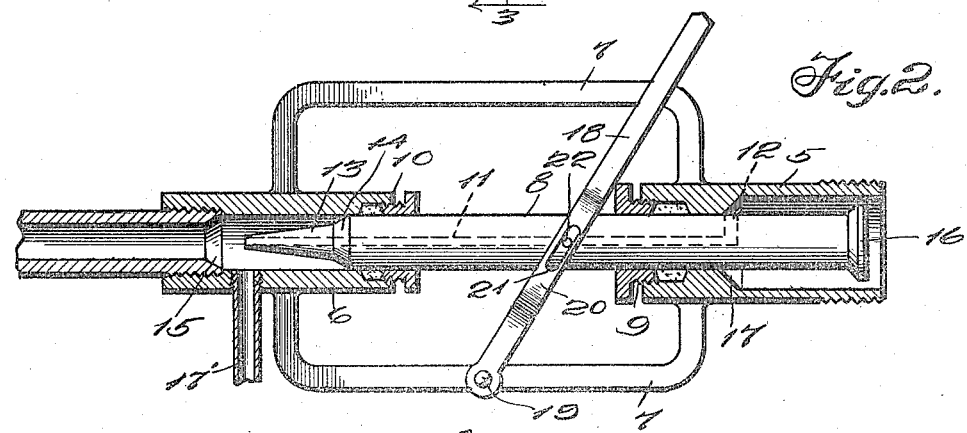
Figure 3:
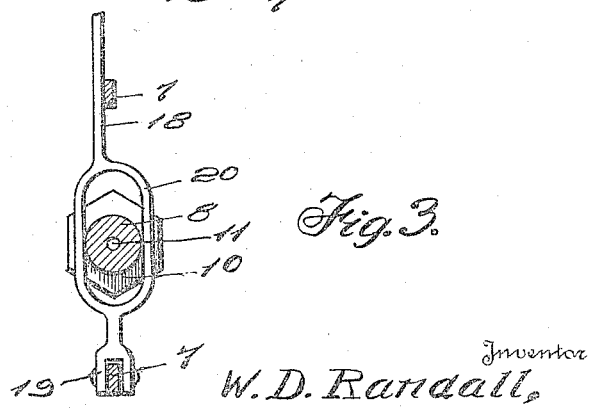

In the accompanying drawings forming a part of this specification and in which like numerals are employed to designate like parts throughout the same, Figure 1 is a central longitudinal sectional view through a valve structure embodying the invention, parts being shown in elevation, with the tubular valve in the closed position. Fig. 2 is a similar view with the tubular valve open, and Fig. 3 is a transverse sectional view taken on line 3—3 of Fig. 1.

In the drawings, wherein for the purpose of illustration is shown a preferred embodiment of my invention, the numeral 5 designates a tubular casing or pipe section adapted for connection with a source of steam. The numeral 6 designates a mixing casing, spaced from the casing 5 and arranged in end to end relation thereto. These casings are rigidly connected by brackets 7, as shown.

Mounted to slide within the casings 5 and 6 is a tubular valve 8, operating through stuffing boxes 9 and 10, carried by the casings 5 and 6 respectively, as shown. This tubular valve is provided with a longitudinally extending port 11, extending therethrough and having a laterally extending end passing through the periphery thereof, as shown at 12. One end of the tubular valve 8 is in the form of a tapered nozzle 13, and the longitudinal opening or bore 11 passes through this nozzle. Adjacent the base of the nozzle is a beveled portion 14, serving as a valve, for contacting with the beveled end of a pipe 15, having screw-threaded engagement within the end of the mixing casing 6, and forming a valve seat therefor. The opening 11 does not extend through the opposite end of the valve 8 but this end of the valve is closed and is provided with a beveled head or valve 16, to engage with a valve seat 17, as shown.

Leading into one side of the mixing casing 6, near the inner end of the pipe 15 is a water supply pipe 17', as shown.

The tubular valve 11 is shifted by means of a lever 18, pivoted to one bracket 7, as shown at 19. This lever has an open frame 20, which straddles the tubular valve 8 and is provided with longitudinal slots 21, receiving pins or trunnions 22 formed upon the tubular valve.

In operation, when the lever 18 is shifted to the left, the beveled valve portion 14 engages the end of the pipe 15 and the valve 16 contacts with its valve seat, the end of the valve 8 also covering the end of the pipe 17'. It is thus apparent that the steam and water are entirely cut off from the mixing casing 6. When the lever 18 is thrown to the right, the inlet end or lateral extension 12 of the opening or bore 11 is placed in communication with the interior of the casing 5 and the valve portion 14 is moved away from its seat, the tubular valve 8 also uncovering the outlet end of the pipe 17'. It is thus apparent that the steam within the casing 5 will pass through the lateral extension 12 of the port 11 and through this port into the mixing casing 6. Upon entering the mixing chamber the steam becomes thoroughly mixed with the water previously supplied thereto through the pipe 17', attention being called to the fact that the tubular valve 8 will uncover the discharge end of pipe 17' prior to the admission of steam into the mixing chamber. This is an important feature of my construction, since it prevents the steam passing into the pipe 15 without the water.

My valve structure is adapted for use upon locomotives, for squirting water upon coal; to be used in any steam or gas line where it is desired to have a complete cut off; etc.

It is to be understood that the form of my invention herewith shown and described is to be taken as a preferred example of the same, but that various changes in the shape, size, and arrangement of parts may be resorted to without departing from the spirit of the invention or the scope of the subjoined claim.

Having thus described the invention, I claim:

In apparatus of the character described, a fluid mixing casing provided near its outlet end with a valve seat and in its side with a water supply device, a steam receiving casing provided near one end with a valve seat and disposed in end to end relation to the mixing casing and spaced a substantial distance therefrom, a frame rigidly connecting the casings, a reciprocatory valve having its forward end provided with a valve portion arranged within the mixing casing to contact with the valve seat therein and its rear end provided with a valve portion arranged within the steam receiving casing to contact with the valve seat therein, said reciprocatory valve having a longitudinal bore passing through the forward end thereof with the rear end of the bore extending laterally and passing through the side of the valve, and a lever mounted to move between the casings and having one end pivotally connected with a portion of the frame and having suitable connection with the reciprocatory valve, to shift it.

In testimony whereof I affix my signature in presence of two witnesses.

WILLIAM D. RANDALL.

Witnesses:
 EDWARD A. SHIDELER,
 E. A. O'DURYER.

Copies of this patent may be obtained for five cents each, by addressing the "Commissioner of Patents, Washington, D. C."